United States Patent [19]

Uchida

[11] 4,186,376
[45] Jan. 29, 1980

[54] ILLUMINABLE SAFETY AND VEHICLE FUNCTION DISPLAY DEVICE

[75] Inventor: Hisao Uchida, Omiya, Japan

[73] Assignees: Nissan Motor Company, Limited, Yokohama; Kanto Seiki Company, Limited, Omiya, both of Japan

[21] Appl. No.: 929,234

[22] Filed: Jul. 31, 1978

[30] Foreign Application Priority Data

Aug. 8, 1977 [JP]  Japan ................... 52-106007[U]

[51] Int. Cl.² ................... G08B 19/00; B60Q 9/00
[52] U.S. Cl. ................... 340/52 F; 340/378.1; 340/525

[58] Field of Search .............. 340/52 D, 52 F, 366 R, 340/366 E, 378 R, 378 A, 380, 524, 525

[56] References Cited

U.S. PATENT DOCUMENTS

| 3,355,708 | 11/1967 | Perry | 340/525 |
| 3,728,673 | 4/1973 | Werda | 340/52 F |
| 3,839,701 | 10/1974 | Pomerantz | 340/52 F |

Primary Examiner—Alvin H. Waring

[57] ABSTRACT

A display device is so constructed that a single illuminating lamp can illuminate not only a caution letter on a labelled display plate but also the corresponding portion of a sketch of vehicle illustrated on a figured display plate.

8 Claims, 2 Drawing Figures

ILLUMINABLE SAFETY AND VEHICLE FUNCTION DISPLAY DEVICE

FIELD OF THE INVENTION

The present invention relates in general to a safety system for a motor vehicle and more particularly to an illuminable safety and vehicle function display device by which a damaged section of the vehicle and an incomplete safety procedure can be easily found or noticed by the passenger especially by the driver.

BACKGROUND OF THE INVENTION

Some modern motor vehicles are equipped at the dashboard panels thereof with an illuminable safety and vehicle function display device or visual alarm device which generally comprises a figured display plate on which a sketch of a vehicle is entirely illustrated, a labelled display plate on which caution letters such as "CHG", "BRAKE", "BELT", "DOOR", etc, are illustrated, and a plurality of illuminating lamps for illuminating a section of the vehicle sketch of the figured display plate which section corresponds to the troubled section of the vehicle and also one of the caution letters of the labelled display plate which one represents the troubled section.

In such visual alarm device, however, it is usual that the illumination of the section of the figured display plate and that of the corresponding caution letter of the labelled display plate are achieved by respective lamps. More specifically, a lamp used in such conventional device acts for illuminating only one portion. Thus, it requires excessive numbers of illuminating lamps to make the device causing a bulky and expensive construction of the same.

SUMMARY OF THE INVENTION

Therefore, an essential object of the present invention is to eliminate the drawbacks encountered in the conventional visual alarm device mentioned above.

Another object of the present invention is to provide an improved illuminable safety and vehicle function display device in which an illuminating lamp is arranged to illuminate not only the section of the figured display plate but also the corresponding caution letter of the labelled plate.

Still another object of the present invention is to provide an improved illuminable safety and vehicle function display device which is economical and compact in construction.

According to the present invention, there is provided an illuminable safety and vehicle function display device, comprising a casing having therein a first group of cells and a second group of cells, each of the first group of cells being connected to one of the second group of cells through an opening formed in the casing; a labelled display plate covering the first group of cells to allow the caution letters thereon to be positioned on the cells respectively; a figured display plate covering the second group of cells; a light shielding plate disposed between the figured display plate and the second group of cells, the shielding plate being formed therein with a plurality of translucent portions each of which is located at a given part of the figured display plate and is arranged on one of the second group of cells; and a single light source disposed in a portion which is open to the opening formed in the casing, whereby a given caution letter of the labelled display plate and also the corresponding translucent portion of the shielding plate are illuminated when the light source is energized to light up.

BRIEF DESCRIPTION OF DRAWINGS

Other objects and advantages of the present invention will become apparent from the following description when taken in conjunction with the accompanying drawings, in which.

DESCRIPTION OF A PREFERRED EMBODIMENT

Figure 1:
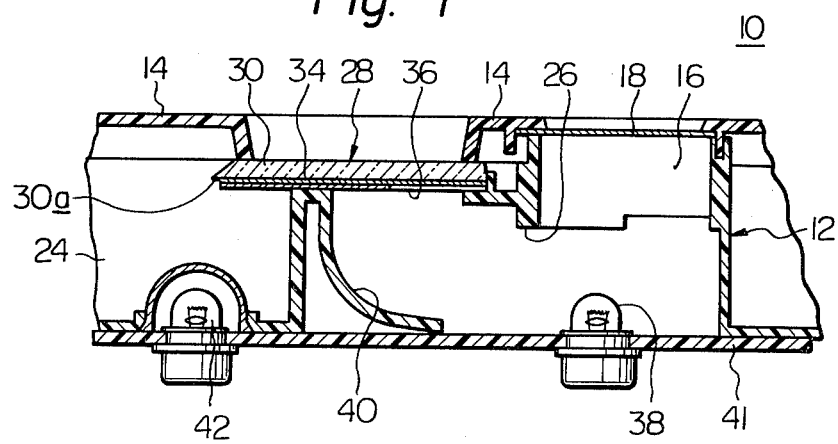
FIG. 1 is a partial sectional view of an improved visual alarm device according to the present invention.
Figure 2:
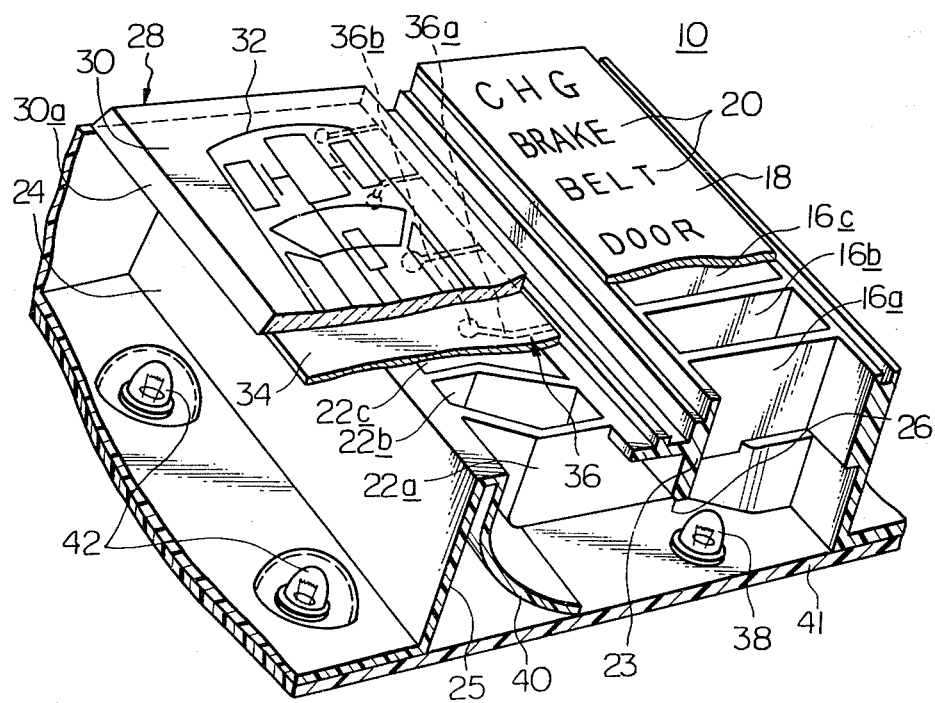
FIG. 2 is a perspective partially broken view of the improved visual alarm device, a cover of which is left removed away from clarification of the drawing.

Referring to FIGS. 1 and 2, there is schematically illustrated a visual alarm device of the subject inventon as being generally designated by numeral 10. The device 10 comprises a casing 12 and a cover 14 (see FIG. 1) covering the casing 12. Within the casing 12, there are formed or defined a plurality of rectangular cells 16a to 16g (numerals 16d to 16g being not shown) which are aligned, as shown in FIG. 2. A labelled translucent plate 18 on which seven caution letters such as CHG, BRAKE, BELT, DOOR, etc, are illustrated covers the openings of the cells 16a to 16g so that the caution letters are positioned on the respective openings of the cells.

Within the casing 12, there is also formed a plurality of different cells 22a to 22g (numerals 22d to 22g being not shown) which are arranged substantially parallel with the row of the rectangular cells 16a to 16g leaving a straight partition wall 23 between the row of the different cells 22a to 22g and the row of the rectangular cells 16a to 16g, as shown. As is best seen from FIG. 2, the different cells 22a to 22g are isolated by another partition wall 25 from a relatively large chamber 24 formed in the casing 12, the detailed explanation of the chamber 24 being made hereinlater. Now, it should be noted that each of the different cells 22a to 22g is connected or merged with one of the rectangular cells 16a to 16g through an opening 26 formed in a lower portion of the partition wall 23.

Designated by numeral 28 is a figured display unit which is arranged to cover the upper openings of the different cells 22a to 22g. The unit 28 comprises a transparent plate 30 on which a sketch 32 of a vehicle is illustrated, and a light shielding plate 34 attached to the lower surface of the transparent plate 30. As will be understood from FIG. 2, the light shielding plate 34 is formed with a plurality of translucent or semi-transparent portions 36 of which includes an elongate section 36a having one end directed to one of the caution letters 20 on the plate 8, and a circular section 36b merged with the other end of the elongate section 36a. The circular section 36b are positioned at given portions of the sketch of the vehicle 32, which portions correspond to vehicular portions or parts to be checked. Each of the translucent portions 36 of the light sheilding plate 34 is thus positioned on one of the cells 22a to 22g, which one is connected to the corresponding rectangular cell on which a caution letter representing the position where the translucent portion is located is arranged. For the reason which will be apparent hereinlater, about one third of the figured display unit 28 is exposed to the large chamber 24 and one peripheral edge portion 30a of the transparent plate 30 is left uncovered by the shielding plate 34 and is formed slant as well shown in the drawings.

A plurality of illuminating lamps 38 (seven in the described case) are respectively disposed in the rectangular cells 16a to 16g. Because of the provision of the openings 26, each lamp 38 can illuminate not only the corresponding caution lefter 20 but also the corresponding translucent portion of the light shielding plate 34 when energized to light up. For increasing the quantity of light directed toward the translucent portions 36, a curved reflector 40 is disposed in the bottom parts of the different cells 22a to 22g. Preferably, the lamps 38 are set on the bottom parts of the respective rectangular cells 16a to 16g as shown. If desired, the bottom parts may be constructed of a printed circuit board 41 for facilitation of wiring.

Within the large chamber 24, more specifically, fixed to the bottom part of the chamber 24 are more illuminating lamps 42 which can illuminate the sketch 32 on the transparent plate 30. The illumination of the sketch 32 is such made that the light emitted from the lamps 42 goes into the uncovered peripheral edge portion 30a of the transparent plate 30 and is then reflected at the slant portion to be directed toward the sketch 32 to illuminate the same. Usually, the lamps 42 are energized for illumination when the passenger compartment is dark.

When a door of the vehicle is left open, for example, the lamp 38 located in the cell 16d is energized to light up illuminating the caution letter "DOOR" and simultaneously a door of the illustrated vehicle or the sketch 32 to give a visual alarm to the vehicle passenger or the driver.

What is claimed is:

1. An illuminable safety and vehicle function display device, comprising:
   a casing having therein a first group of cells and a second group of cells, each of said first group of cells being connected to one of said second group of cells through an opening formed in said casing;
   a labelled display plate covering said first group of cells to allow the caution letters thereon to be positioned on the cells respectively;
   a figured display plate covering said second group of cells;
   a light shielding plate disposed between said figured display plate and said second group of cells, said shielding plate being formed therein with a plurality of translucent portions each of which is located at a given part of said figured display plate and is arranged on one of said second group of cells; and
   a single light source disposed in a portion which is open to said opening formed in the casing, whereby a given caution letter of said labelled display plate and also the corresponding translucent portion of said shielding plate are illuminated when said light source is energized to light up.

2. An illuminable safety and vehicle function display device as claimed in claim 1, in which said light source is disposed in each of said first group of cells.

3. An illuminable safety and vehicle function display device as claimed in claim 2, in which said labelled display plate and said figured display plate are constructed of translucent and transparent materials, respectively.

4. An illuminable safety and vehicle function display device as claimed in claim 2, in which the figure of said figured display plate is a sketch of a vehicle.

5. An illuminable safety and vehicle function display device as claimed in claim 2, further comprising means for illuminating the figure of said figured display plate.

6. An illuminable safety and vehicle function display device as claimed in claim 5, in which said means comprises:
   an edge portion of said figured display plate, said edge portion being uncovered by said shielding plate and formed into a slant porton; and
   a light source for emitting the light which goes into the uncovered edge portion to be reflexed at the slant portion and directed toward the figure on said figured display plate.

7. an illuminable safety and vehicle function display device as claimed in claim 2, further comprising a printed circuit board which constitutes the bottom portion of said casing for mounting thereon said light source.

8. An illuminable safety and vehicle function display device as claimed in claim 2, further comprising a light reflector which is disposed in each of said second group of cells for reflecting the light from the light source toward the translucent portion of said shielding plate.

* * * * *